W. B. FLEMING.
ELECTRICALLY OPERATED ORGAN.
APPLICATION FILED JAN. 24, 1902.
982,419.
Patented Jan. 24, 1911.
4 SHEETS—SHEET 2.
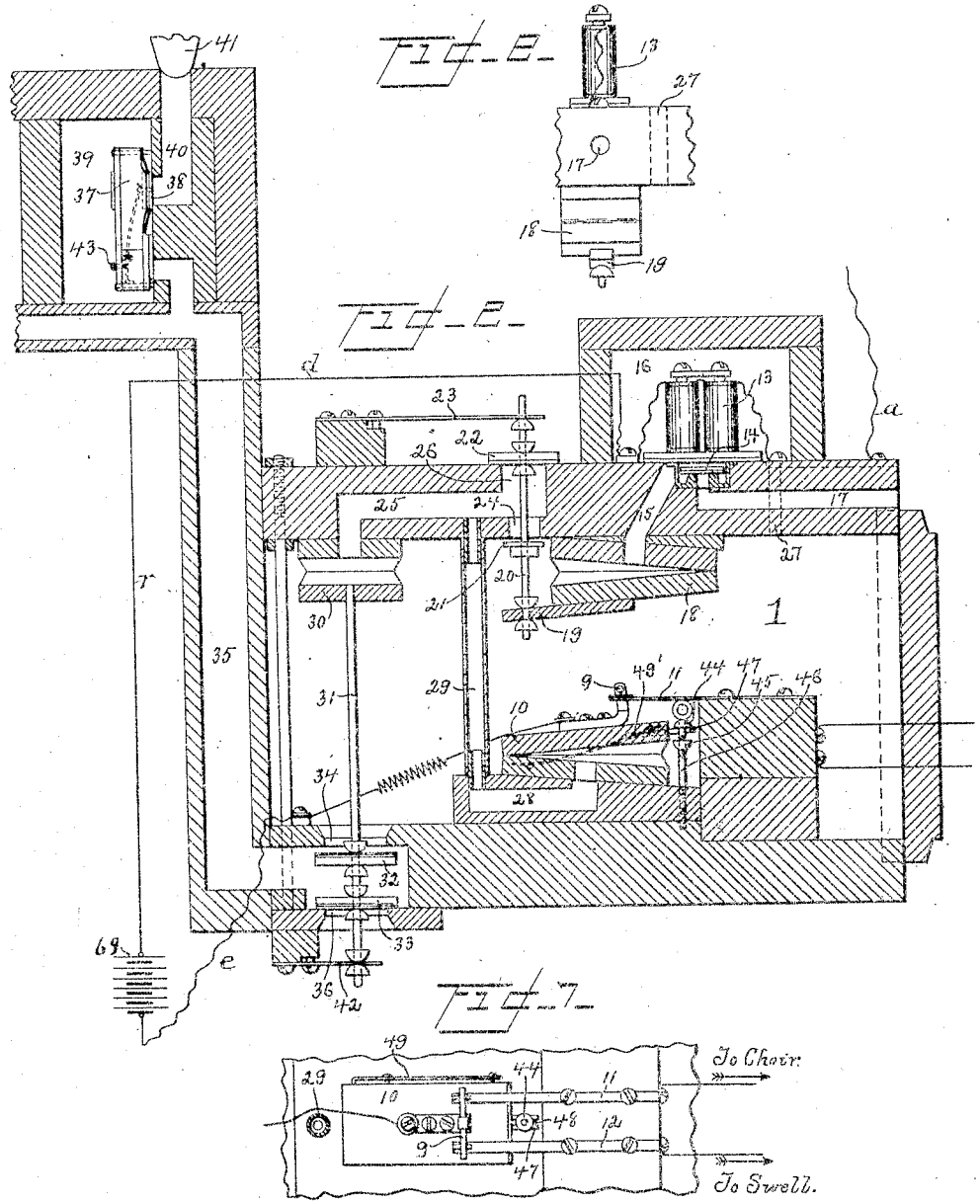
WITNESSES
Chas. L. Hyde.
Mattie McGinnis.
INVENTOR
William B Fleming
BY Hazard & Harpham
ATTORNEYS W. B. FLEMING.
ELECTRICALLY OPERATED ORGAN.
APPLICATION FILED JAN. 24, 1902.
982,419.
Patented Jan. 24, 1911.
4 SHEETS—SHEET 3.
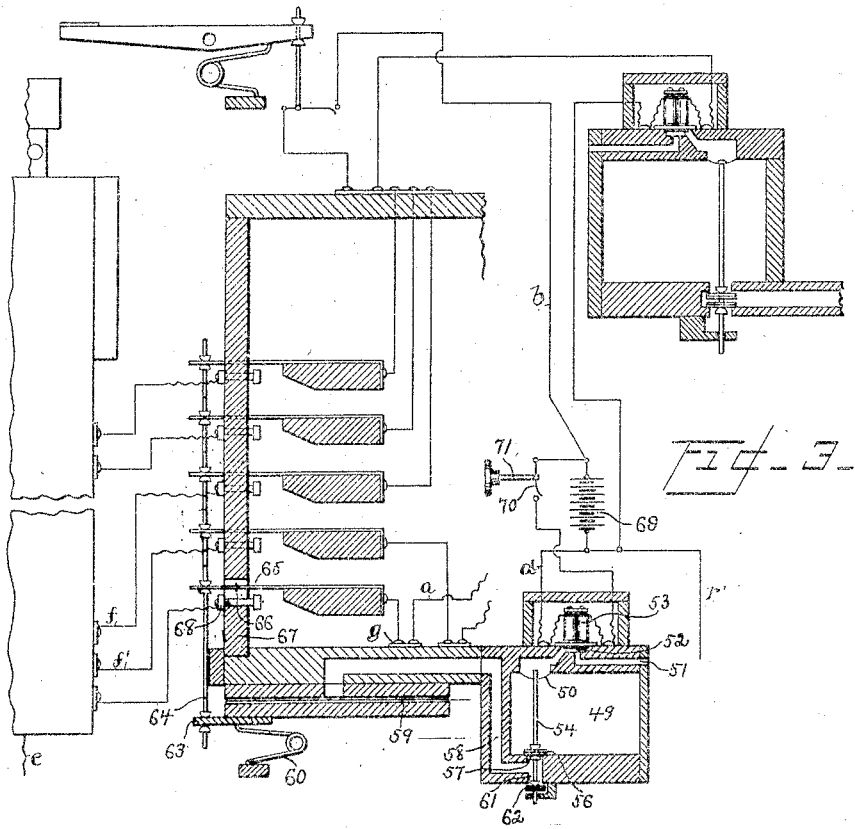
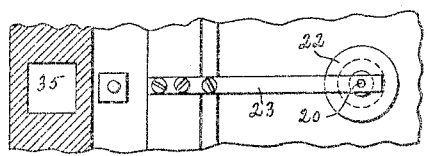
WITNESSES
Chas. L. Hyde.
Mattie McGinnis
INVENTOR
William B Fleming
BY Hazard & Harpham
ATTORNEYS

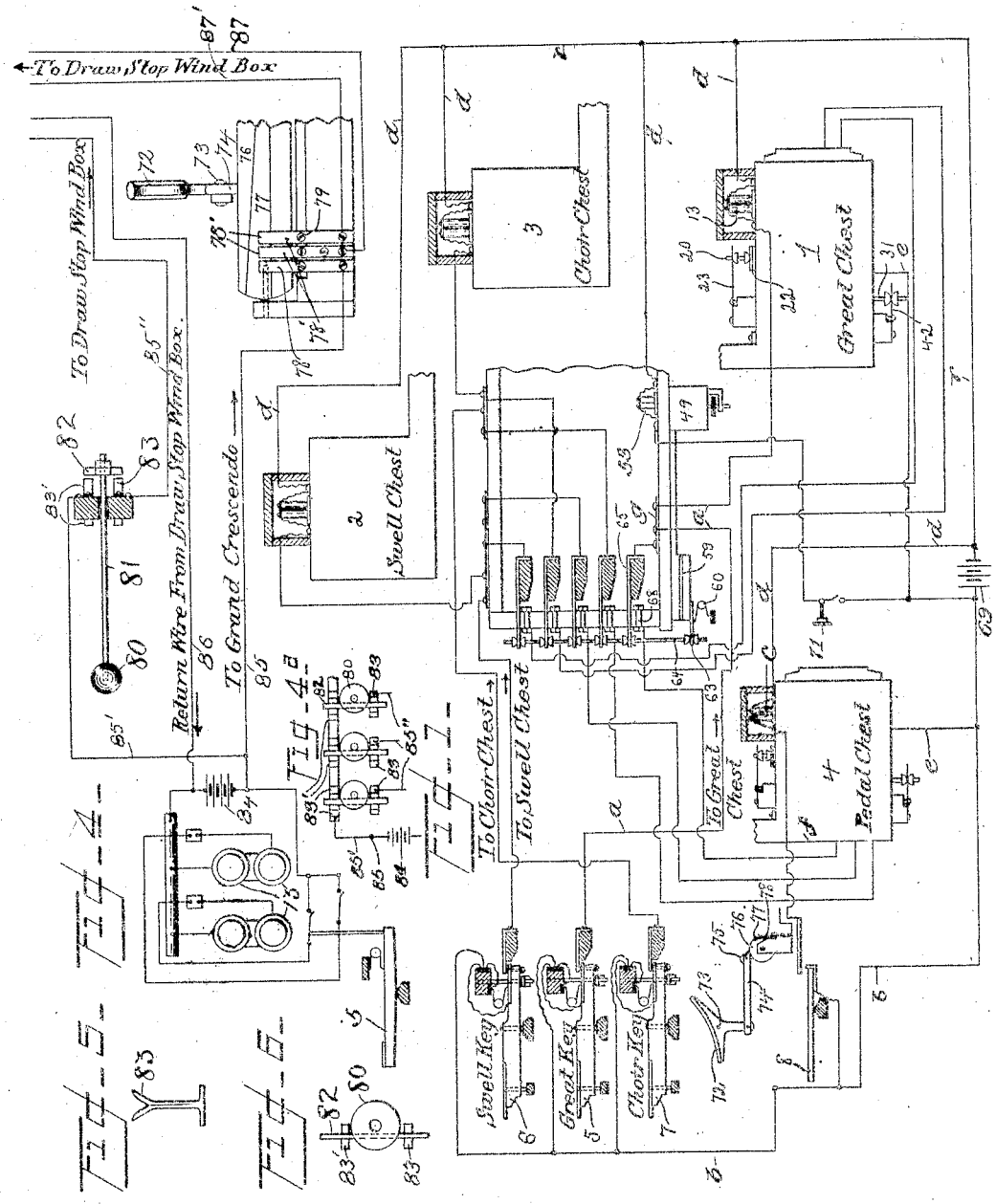

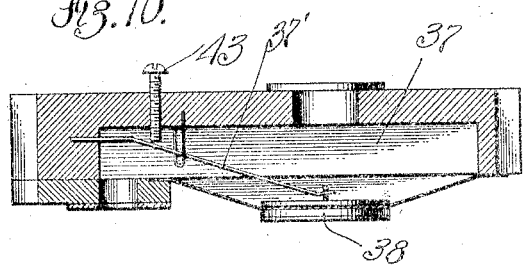
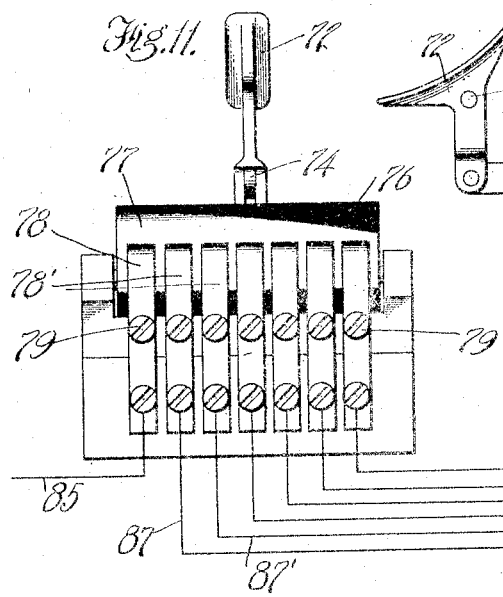
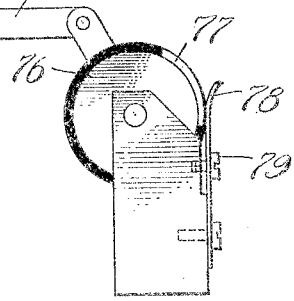

UNITED STATES PATENT OFFICE.

WILLIAM B. FLEMING, OF LOS ANGELES, CALIFORNIA.

ELECTRICALLY-OPERATED ORGAN.

982,419.  Specification of Letters Patent.  Patented Jan. 24, 1911.

Application filed January 24, 1902. Serial No. 91,120.

*To all whom it may concern:*

Be it known that I, WILLIAM B. FLEMING, a citizen of the United States, residing at Los Angeles, in the county of Los Angeles, State of California, have invented new and useful Improvements in Electrically-Operated Organs, of which the following is a specification.

My invention has for its objects certain new and useful improvements in electrically actuated pipe organs; and it consists of the combination, arrangement, and structure of certain devices hereinafter described and claimed, and illustrated in the accompanying drawings, in which—

Figure 1 is a diagrammatic view, partly in section, illustrating parts of my invention. Fig. 2 is a vertical section of the pallet box and pouch pneumatic. Fig. 3 is a view in diagram and in section, and partly in elevation, illustrating features of my invention. Fig. 4 is a diagrammatic view, partly in section, showing certain features of my invention. Fig. 4ᵃ shows a plurality of stops 80. Figs. 5 and 6 are detail views of the draw stop, shown in Fig. 4. Figs. 7 and 8 are plan views of parts shown in Fig. 2. Fig. 9 is a detail view of parts shown in Fig. 2. Fig. 10 is an enlarged longitudinal central section of the pouch pneumatic and the regulating screw for regulating the tension of the pallet spring shown in Fig. 4. Fig. 11 is a side elevation of a part of the crescendo mechanism shown in Fig. 4. Fig. 12 is an end view of the parts shown in Fig. 11.

In the diagrammatic drawing, represented in Fig. 1, the great chest is represented by the numeral 1, the swell chest by 2, the choir chest by 3, the pedal chest by 4, the great keys by 5, the swell keys by 6, the choir keys by 7, and the pedal keys by 8. The various circuits are the same as those shown in the patent issued to me on February 20th, 1900, #643,840.

In the drawings, (Fig. 2) 1 represents a pallet, or great chest, which is continually supplied with air from the bellows (not shown) during the time the organ is operated. The chest operates the great organ. Coupler contact 9, affixed to pneumatic 10, is brought into or disconnected from contact with springs 11 and 12 by the action of pneumatic 10. This coupler contact is so arranged that it provides for the shrinking and swelling of the wood, and at all times makes a perfect contact, or is perfectly freed from contact, which is not the case in all contacts for a like purpose with which I am acquainted. When the great key 5 is depressed by the finger of the operator the circuit is closed and electro-magnet 13 is energized, thereby attracting and drawing to it its armature 14, which closes the opening between channel 15 and wind box 16 and opens communication between channel 15 and channel 17, thereby permitting pneumatic 18 to exhaust to the open air. To the bottom of pneumatic 18 is rigidly affixed arm 19, to which is connected rod 20, to which are attached pallets 21 and 22. Rod 20 is held normally depressed by spring 23. When pneumatic 18 is exhausted, rod 20 is raised against the pressure of spring 23 and carries pallet 21, to close port 24, thereby closing communication between wind box 1 and channel 25, and at the same time it carries pallet 22 away from port 26, so that channel 25 is in communication with the outside air. Pneumatic 10 then exhausts through channel 28 and pipe 29, which connects channel 28 with channel 25, which brings coupler contact 9 in contact with springs 11 and 12, as shown in Fig. 7. These springs are electrically connected one with the swell and the other with the choir organs when the proper stops, or switches, are drawn. This completes the circuit through the coupler or switch, as described in Patent #643,840, issued to me on Feb. 20th, 1900, and, when this coupler switch is drawn, enables the operation of swell and choir organs at the same time, from the great organ keys, as described in said patent, the improvement herein being in the manner of making and breaking the circuit through the coupler contact 9 and connected mechanism. At the same time pneumatic 10 exhausts, pneumatic 30 exhausts through channel 25, and by means of rod 31, carrying pallets 32 and 33, closes port 34, which forms communication between pallet box 1 and channel 35, and opens port 36, thereby permitting pouch pneumatic 37 to exhaust through channel 35. When the pouch pneumatic 37 is exhausted it operates pallet 38 to open communication between wind chamber 39 and channel 40, thereby permitting the air from box 39 to pass into and through channel 40 and operate organ pipe 41. Wind box 16 is in communication with wind box 1 through bleed hole 27, shown in dotted lines in Figs. 2 and 9.

When the operator releases the pressure on the key it returns to its normal position, and the circuit is broken. Spring 23 then causes pneumatic 18 to become reinflated, causes pallet 22 to close port 26 and pallet 21 to open port 24, and the several parts perform the reverse operations to those described when the circuit was established, and resume their normal position, as shown in the drawings. Spring 42, on the end of rod 31, assists in the reinflation of pneumatic 30.

The pouch pneumatic and its operation are fully described in Patent #593,391 issued to me Nov. 30th, 1897, but in that patent there is nothing provided to regulate the tension of the spring 37′ which closes the pallet which controls the port between the wind chest 39 and the channel which leads to the organ pipe. In this device I regulate the tension of the spring by means of screw 43 which passes through the casing of the pouch and bears upon the spring intermediate the ends to make it greater or less as the wind pressure is higher or lower, the same varying from 3½ inches to 20 inches so as to make the action of the pallet perfect. Without this regulating screw it is very difficult to produce a spring which will give the pallet a perfect action. The stud 46, passing through the slot 48 in arm 47, attached to the top of pneumatic 10, limits the movement of the top board of the pneumatic to the distance between the nuts 44 and 45, on said stud 46, so as to regulate and make certain the clearance and contact of contact 9 with springs 11 and 12. Spring 49′, shown in dotted lines on the side of pneumatic 10, in Fig. 2, and in full lines in Fig. 7, opens it after its collapsing force is withdrawn. When playing the great organ, pneumatic 10 will operate every time a key is depressed, thereby closing the circuit and causing contact 9 and springs 11 and 12 to come together, thus keeping the contact clean.

It will be understood that the operative mechanism of the swell and choir chest are the same, that is, one is the duplicate of the other, and that by coupling the swell chest to the great chest, and the choir chest to the great chest, the pipes operated by each chest are played by the operator of the great keys at the same time that the great organ is operated.

By coupling the great chest to the pedal keys, and the swell chest to the pedal keys, the pipes operated by each chest, and by the pedal chest are played by the operation of the pedal keys, thus giving as many lower notes of the manual as there are pedal keys. In other words, by coupling swell to great, and choir to great, and by drawing great to pedal coupler, all the lower notes of the manuals are produced by the operation of the pedal keys, in the same manner as though each chest were independently operated by the manual operation of the respective key boards which separately control each.

The detail of the manner of coupling the different organs together is illustrated in Fig. 3, and is accomplished as follows, which will be described by showing the coupling of the great organ to the pedal keys. 49 is a coupler wind box, which is constantly supplied with wind from the organ bellows. In the top of this box is pouch 50, from which leads a channel 51 in the top board of the box to the outer air. Normally the channel is kept closed by the armature 52 of magnet 53, which keeps the pouch filled with air. To the bottom of this pouch is connected rod 54, on which is mounted pallet 56, which controls port 57, which connects the coupler box with channel 58, that leads to pneumatic 59, which is held normally collapsed by spring 60. Channel 58 is also in communication with the open air through port 61. Rod 54 also carries pallet 62, which is adapted to close port 61, when the pouch is exhausted, as hereinafter explained. To the bottom board of pneumatic 59 is arm 63 to which is attached rod 64. The upper end of this rod is attached to contact spring 65, which has a vertical movement in slot 66, in supporting timber 67, to which timber is attached contact 68, which is electrically connected with the pedal pallet box. Contact spring 65 is electrically connected with the circuit which operates the organ. Magnet 53 is electrically connected with battery 69 in a circuit which normally is open, and in which circuit is switch 70, which is controlled by pedal stop 71.

Now, when it is desired to connect great to pedal, stop 71 is drawn and the circuit which operates magnet 53 is closed, thereby energizing the magnet which draws its armature out of passage 51, so that pouch 50 may be exhausted. The exhaustion of pouch 50 raises rod 54, which carries pallets 56 and 62, to open communication between coupler wind box 49 and channel 58, and to close channel 58 to the air. The air from the coupler wind box inflates pneumatic 59, which causes rod 64 to depress spring 65 until it touches contact 68, which establishes the circuit between pedal and great, and thereafter the operation of the pedal keys will operate the lower notes of the great organ, at the same time that the notes of the pedal organ are operated, and by the same keys. The circuit runs from the great key to the magnet 13, in the great chest, thence through the common return $d$ and $r$ to battery 69. The wire $b$ leads from the battery to all of the keys. When contact 65 engages contact 68, as before explained, a circuit will be established through magnet $c$ of the pedal chest by wire $d$ so that when the great keys are operated the pedal chest, as well as the great chest is played. The wire $e$ leads from the battery wire to the pedal chest and the wires $f$ lead from the pedal chest to the switch mechanism. The various circuits connecting the various organs together are shown diagrammatically in Fig. 1. and the mechanism for connecting the different organs together, as before stated, is the duplicate of that above described. In similar manner, and by a like mechanism, the choir chest, or organ, is separately connected with the pedal, and the choir chest, or organ, and the swell chest, or organ, are separately connected with the great chest, or organ. When the several organs are connected with the great organ, all the notes of each of the connected organs are played at the same time that the like notes of the great organ are played, and by the manipulation of the great organ keys.

In Figs. 1 and 4, 72 is the crescendo pedal, pivotally mounted on pivot 73, to the lower arm of which is attached bar 74, the other end of which is connected to arm 75, which arm is in turn rigidly affixed to roller 76, of nonconducting material. Roller 76 has a small tapering metallic plate 77, preferably of brass or copper, let in flush with the periphery thereof, which extends longitudinally and is electrically connected in the circuit that extends to the draw stop wind-box (not shown), where the chest pneumatics are located. 78 is a contact spring which is electrically connected to one side of battery 84 by line wire 85. The other side of this battery is electrically connected to draw stop box of each organ, not shown, by line wire 86. 78' are contact springs which are also electrically connected to the draw stop wind-box of each organ, there being one of these contact springs for each draw stop. Contact springs 78 and 78' normally rest on the nonconducting portion of roller 76. Tension screws 79 are provided to give to these springs a proper contact with the roller. By the oscillation of pedal 72 the metallic strip 77 on roller 76 is brought into, or removed from, contact with the contact springs which makes or breaks the circuit. As the metallic strip is tapering the contact and break thereof with the contact spring is gradual, thereby producing a crescendo. It will be observed that the crescendo of each organ may be obtained by drawing the proper stops.

In Fig. 4 is diagrammatically illustrated the connection between a portion of the ordinary stop mechanism and what I will call the grand crescendo mechanism composed of the roller and contact springs. 80 is the knob of the stop bar 81 to which is secured contact bar 82. When the stop is drawn this contact bar is drawn into engagement with contacts 83 and 83'. Contact 83 is connected to one side of the stop mechanism of one of the independent organs not shown, by wire 85''. Contact 83' is connected by wires 85' and 85 with one side of battery 84. Wire 85 also connects contact 78 with the battery. The other side of the battery is connected to the other side of the stop mechanism of the organ by wire 86, which wire also forms the return from the same organ of the grand crescendo mechanism. The contact springs 78' are connected by wires 87 and 87' with the stop mechanism of the different organs.

Now, if some of the stops are drawn, and others are not drawn, and the player wishes to produce a sforzando effect he obtains it by the rotation of roller 76, to bring all the contact springs in contact with plate 77; this operation in no manner interferes with those organs in which the stops are drawn. There are as many contact springs as there are draw stops 80 and couplers to be used on crescendo on full organ, the whole number varying with the size of the organ, and ranging from 4 to 150. The details of the stop mechanism are shown in Figs. 4, 5, and 6, and need not be further described; the purpose of their illustration being to show connection between them operated by the foot and the usual stop mechanism.

The left hand portion of Fig. 4 is a plan view of a part of magnets 13, removed from box 16, and Fig. 9 is a side view of one of the magnets. Fig. 8 is a plan of spring 23, and connected parts, to illustrate its relation thereto. It will be understood that these different parts mentioned in the foregoing description, which are connected together to produce any of the different effects, are duplicated for each of the great organ keys.

Having described my invention, what I claim as new and desire to secure by Letters Patent is—

1. In an organ the combination of a great wind box; a wind channel having an exhaust, said channel being communicable with said wind box; a pneumatic; valves actuated by said pneumatic to control the communication of said wind box with said channel and the exhaust therefrom; a wind channel communicable with said pneumatic and with the great wind box, said channel having an exhaust; a second pneumatic; valves actuated thereby to control the communication between the wind box and the channel leading to the first pneumatic and the exhaust from said channel; a channel leading from said second pneumatic to the open air; an electro-magnet to control said last channel; means to operate said electro-magnet.

2. In an organ the combination of a great wind box; springs electrically connected one with a choir chest and the other with the swell chest affixed to said box; a pneumatic; a contact affixed thereto which will engage said springs when the pneumatic is exhausted and disengage therefrom when said pneumatic is inflated; a wind channel communicable with said wind box and having an exhaust; a second pneumatic; valves actuated by said second pneumatic to control the communication of said wind box with said channel and the exhaust therefrom; a wind channel communicable with said second pneumatic and with said wind box, said channel having an exhaust; a channel leading from said last channel to the first pneumatic; a third pneumatic having a channel leading therefrom to the open air; an electro-magnet to control said last channel; means to operate said electro-magnet; valves actuated by said third pneumatic to control the communication between the wind box and the channel leading to the second pneumatic and the exhaust from said channel.

3. In combination a great organ; a choir organ; a swell organ; and a solo organ; normally open parallel electric circuits connecting the great organ with said other organs, said circuits extending into the wind box of the great organ; a secondary pneumatic for each of the circuits located in the wind box of the great organ, and each having an exhaust channel; a contact in each of said circuits affixed to its respective pneumatic; contact-springs within the wind box of the great organ secured to the casing thereof and forming parts of the circuits and located in the paths of the movable contacts so as to be engaged thereby on the exhaustion of the pneumatics and to be disengaged therefrom on the inflation of the pneumatics, there being as many contact springs as there are circuits; means to operate said secondary pneumatics comprising primary pneumatics, there being as many primary pneumatics as secondary pneumatics, each primary pneumatic having an electrically controlled exhaust channel; and valves controlling the exhaust channels of the secondary pneumatics, said valves being controlled by said primary pneumatics.

4. In combination, a great organ having a wind box and another organ; a normally open electric circuit passing through said wind box and connecting when closed said great and said other organ; a contact spring in said wind box forming a part of said circuit; a pneumatic within said wind box; a contact carried by said pneumatic forming a part of said circuit, said last contact being adapted to engage said spring contact and close said circuit on the exhaustion of the pneumatic; and means to cause the exhaustion of said pneumatic.

5. A great organ having a great wind box; other organs; normally open electric circuits extending through said great wind box and connecting the great organ with the other organs; a pneumatic within said great wind box; a contact in each of the circuits passing through said box affixed to a pneumatic therein; means to limit the movement of said contacts comprising a slotted arm affixed to the top of each pneumatic; a screw stud rigidly affixed to the bottom of said box and passing through the slot in said arm; nuts on said stud one above and the other below said arm.

In witness that I claim the foregoing I have hereunto subscribed my name this 16th day of January, 1902.

WILLIAM B. FLEMING.

Witnesses:
 G. E. HARPHAM,
 MATTIE McGINNIS.